Feb. 28, 1928.

N. PEMBERTON-BILLING 1,660,471

GRAMOPHONE AND LIKE MACHINE

Filed Nov. 17, 1926

Inventor:
Noel Pemberton-Billing,
By Byrnes, Stebbins & Parmelee
Attys.

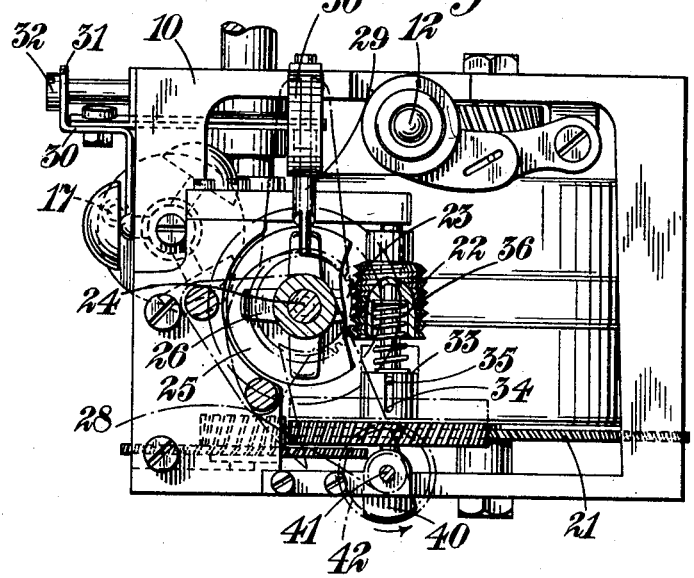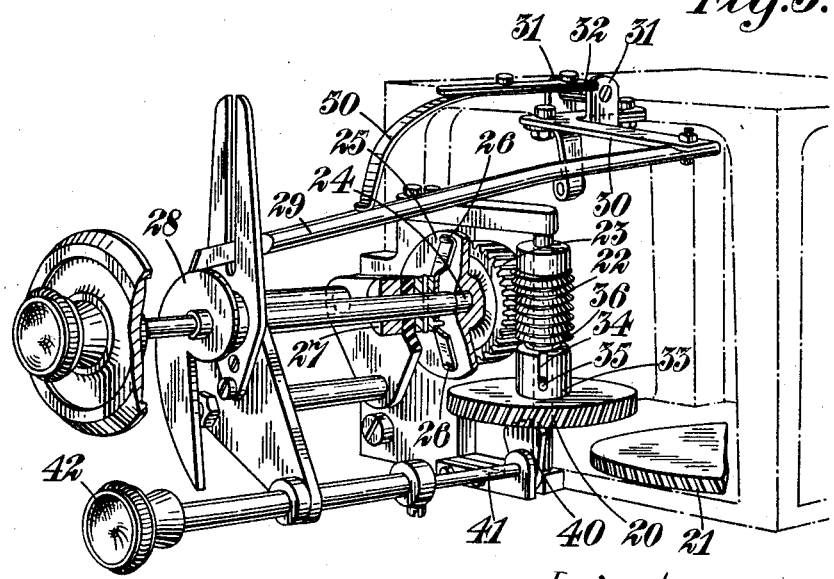

Patented Feb. 28, 1928.

1,660,471

UNITED STATES PATENT OFFICE.

NOEL PEMBERTON-BILLING, OF TWICKENHAM, ENGLAND, ASSIGNOR TO THE DUOPHONE AND UNBREAKABLE RECORD COMPANY, OF LONDON, ENGLAND, A BRITISH COMPANY.

GRAMOPHONE AND LIKE MACHINE.

Application filed November 17, 1926, Serial No. 148,957, and in Great Britain November 24, 1925.

This invention consists in improvements in or relating to gramophone and like machines and has for one of its objects to provide a simple means whereby the motor can, at will, be caused to rotate a turntable or other record carrier either at a constant angular velocity or at a variable angular velocity such that the linear speed of the record surface in relation to the stylus point remains constant.

Suggestions have been made in the past for constructing gramophone driving mechanism in such a way that the constant linear speed relationship between the record surface and the stylus point is obtained. Other suggestions have been made whereby with the aid of an attachment the speed of the turntable or record support can be controlled to produce the constant linear speed relationship although the motor device was designed and intended to drive the record support at a constant angular velocity.

By the present invention a driving mechanism is afforded with which at will either the constant angular velocity or the constant linear speed relationship above referred to can be obtained. According to the invention in or for a gramophone or like machine there is the combination with a motor and a speed-controlling governor therefor, of a movable (for example rotatable) cam operatively connected with said governor, a driving connection between the cam and the motor and means for releasing the cam driving connection when desired so as to permit the cam to be manually actuated. The purpose of the operative connection between the cam and the governor is to enable the cam to regulate the operation of the governor so that as the cam is moved the governor is regulated to permit or cause the speed of the motor to change progressively, for instance to increase progressively.

Preferably the driving connection between the cam and the motor is a connection other than that between the governor and the motor. Preferably also the motor is a spring-driven motor and the cam driving connection is engaged directly with the main gear member of the motor.

A subsidiary feature of the invention comprises a friction device which constitutes a portion of the cam driving connection so that the surface of the cam, which at any particular instant serves to regulate the governor, can be adjusted in relation to the adjustment imparted or permitted by the driving connection.

The invention also includes an attachment capable of application to an existing spring-driven motor whereby the above described alternative means of driving the turntable or like part can be obtained.

One preferred construction will now be described by way of example only with the aid of the accompanying drawings in which—

Figure 2 is a view looking from the right of Figure 1; and

Figure 3 is a perspective view showing the attachment according to the invention in its relation to the casing of the spring motor.

Like reference numerals indicate like parts in all the figures of the drawings.

Figure 1:
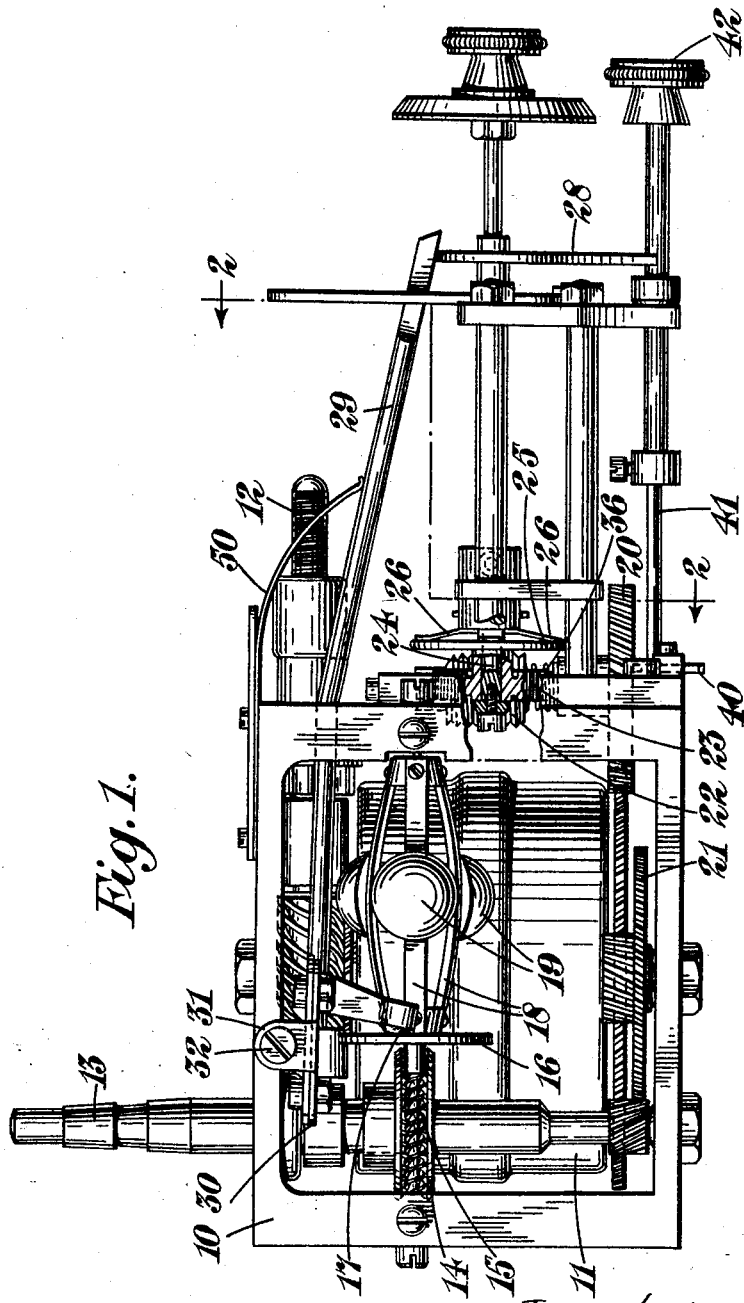
Figure 1 is a side elevation of a spring motor and attached parts constructed in accordance with the invention.

The invention is shown as applied to a gramophone of the disc record type. The spring motor is of any ordinary form and comprises, in the example illustrated, a framework 10 in which is housed a spring casing 11 with the usual winding and driving gears. The winding gears are actuated by means of the winding spindle 12 and the driving gears serve to transmit rotary motion to the turntable spindle 13.

A worm wheel 14 carried by the spindle 13 meshes with a worm 15 which is fast on or forms an extension of the spindle of a spring-controlled governor of the centrifugal type having a brake disc 16 which co-operates with an adjustable brake pad carried in an arm 17. The governor is of known type comprising springs 18 and weights 19 and it is usual in this type of mechanism to provide all the parts just described in connection with the accompanying drawings.

In order to afford the speed control according to the present invention an attachment is provided comprising a gear member 20 which is intermeshed with one of the main gear elements such as 21 fast on and movable with the rotatable element of the spring casing 11. The gear wheel 20 is slidingly carried on but is splined to the spindle of a worm 22 which meshes with a worm-wheel 23. The latter is free to rotate on a spindle 24 which will be hereinafter referred to as a "cam spindle".

A friction clutch serves as the normal driving connection between the worm-wheel 23 and the spindle 24. This clutch comprises a disc 25 which is solid with or secured to the worm-wheel 23 and spring arms 26 which radiate from a boss 27 that is fast on the spindle 24. It will be thus seen that as the worm-wheel 23 rotates the friction between the arms 26 and the disc 25 will also rotate the spindle 24; but if the wheel 23 is held stationary the spindle 24 can nevertheless be angularly adjusted, slip occurring in these circumstances between the arms 26 and the face of the disc 25.

On the spindle 24 is mounted a small cam 28 the edge of which is in engagement with an arm 29 that is secured to a bracket 30 from which the brake-arm 17 depends. The bracket 30 has two ears or lugs 31 which are mounted to rock about a pivot 32 constituted by a screw engaging in one of the frame members 10. It will therefore be seen that as the arm 29 is moved by the action of the snail cam 28 the bracket 30 rocks about the pivot 32 and thus moves the brake arm 17 with its brake pad towards or away from the brake disc 16 thus controlling the centrifugal governor in the manner well understood in motors of this class. By the use of the snail cam 28 the speed of the motor can be changed progressively and it will be appreciated that when the gears 20 and 21 are intermeshed this progressive change will be brought about during the unwinding of the main spring of the motor. The gear ratio of the drive between the motor gear member and the spindle 24 is preferably such that the cam is rotated through one complete revolution during the time, that is during the number of revolutions of the turntable spindle 13, that will be taken for a record to be played.

It will be therefore seen that the curvature of the snail cam 28 can be so designed that the angular speed of the spindle 13 is progressively changed so as to maintain a constant linear speed velocity between the surface of the disc record (which is rotatable with a turntable driven by the spindle 13) and the stylus point of the sound-box of the gramophone.

It has been stated above that the gear member 20 is splined on the spindle of the worm 22. From Figure 2 it will be seen clearly that the gear member 20 is integral with a boss 33 in which is cut a slot 34. A pin 35 fast on the spindle of the worm 22 engages in the slot 34 and establishes a driving connection between the spindle of the worm 22 and the gear member 20 whilst allowing the gear member to slide axially on the worm spindle. A coil spring 36 normally presses the gear member downwardly so as to maintain it in mesh with the gear 21.

When it is desired to disconnect the driving connection between the gears 20 and 21 the gear 20 is raised against the action of the spring 36 so that it is brought out of mesh with the gear 21. This is effected by means of a lifting cam 40 fast on a spindle 41 at the extremity of which is a handle 42 by means of which the spindle 41 can be rotated.

When, therefore, the cam 40 is turned by means of the spindle 41 through an angle of 180° from the position illustrated in Figures 1 and 2, that is to say, when it is turned into the position illustrated in Figure 3, the gear 20 is moved out from engagement with the gear 21 and the worm 22 will be no longer driven from the motor. Consequently the turntable spindle 13 will be rotated at a constant angular speed and the speed of rotation of the spindle 13 will be adjusted by means of the brake arm 17 in co-operation with the disc 16. The adjustment of the brake arm 17 is manually effected by adjustment of the cam 28, the friction clutch 25, 26 enabling this adjustment to be made at will. When the gear 20 is raised out of mesh with the gear 21 the motor will then function in the known manner of a gramophone motor of which the turntable spindle is intended to rotate at a constant angular velocity which velocity is regulatable by means of a manual control through the medium of the brake arm 17 and disc 16.

As the cam drive is disconnected the cam 28 will remain in any position to which it is adjusted so long as the gear 20 is raised by means of the cam 40, to the position shown in Figure 3. These conditions can be readily changed by operation of the cam 40 as, when the latter is turned to the position shown in Figures 1 and 2, the gears 20 and 21 will be intermeshed and the cam 28 will then be driven from the spring motor so as to produce the constant linear speed relationship above described.

Even when the gears 20 and 21 are intermeshed the speed at any instant can be regulated by manual adjustment of the spindle 24, this adjustment being possible by reason of the provision of the clutch 25, 26.

The cam 28 may act as an ordinary stop mechanism because when the highest point of the cam leaves the arm 29 the latter, under influence of a strip spring 50, will drop on to the lowest point of the cam and this point may be so regulated that the brake arm 17 is moved into a position at which rotation of the spring motor is completely arrested.

It will be obvious that although one specific form of the invention has been described in detail herein, many modifications may be made in the construction and arrangement of the several parts of the mechanism constituting the invention. For example the construction of the parts by which the snail cam 28 is interconnected with the brake arm 17 may be modified in various ways provided that movement is imparted to the brake arm by rotation of the snail cam. Furthermore the means by which the driving connection between the spring motor and the snail cam is established and disconnected may be other than that described herein; and the form of friction clutch between the worm-wheel 23 and the spindle 24 may obviously be different from that shown.

It will be seen from Figure 3 that the parts there illustrated are applicable to motors at present employed in gramophones or like machines that are intended for driving the turntable spindle at a constant angular velocity. Thus such a machine can be readily and quickly fitted with the attachment thereby providing a dual purpose machine, that is to say, one in which at will either the constant angular velocity of the turntable can be obtained or a constant linear speed relationship can be established between the surface of the record and the stylus point of the sound-box.

I claim:—

1. In a gramophone, the combination of a motor, a speed-controlling governor therefor, a governor control device, a movable controlling element operatively connected with said governor control device, a driving connection between the motor and said movable controlling element and a friction clutch which constitutes part of said movable controlling element in relation to the drive of the motor to adjust the said governor control device without otherwise interrupting the drive of the motor to the said movable controlling element.

2. In a gramophone, the combination of a motor, a speed controlling governor therefor, a governor control device, a rotatable cam disc operatively connected with said governor control device, a driving connection between the motor and said cam disc comprising a train of gears and a friction clutch, and means for rotatably adjusting the said cam disc in relation to the drive of the motor to adjust the said governor control device without otherwise interrupting the drive of the motor.

3. In a gramophone, the combination of a motor, a speed controlling governor therefor, a governor control device, a rotatable cam disc, a spindle carrying said cam disc, a friction clutch on said spindle, a train of gears connecting the friction clutch to the motor and means for rotatably adjusting the cam disc in relation to the drive of the motor to adjust the governor control device without otherwise interrupting the drive of the motor.

4. In a gramophone, the combination of a motor, a speed-controlling governor therefor, a governor control device, a movable controlling element operatively connected with said governor control device, a driving connection between the motor and said movable controlling element, means to establish and release said driving connection and a friction clutch which constitutes part of said driving connection and which permits adjustment of said movable controlling element in relation to the drive of the motor to adjust the said governor control device without otherwise interrupting the drive of the motor to the said movable controlling element.

5. In a gramophone, the combination of a motor, a speed-controlling governor therefor, a governor control device, a rotatable cam disc operatively connected with said governor control device, a driving connection between the motor and said cam disc comprising a train of gears and a friction clutch, manually operable means to move into and out of gear a member of said train of gears, and means for rotatably adjusting the said cam disc in relation to the drive of the motor to adjust the said governor control device without otherwise interrupting the drive of the motor.

6. In a gramophone, the combination of a motor, a speed-controlling governor therefor, a governor control device, a rotatable cam disc operatively connected with said governor control device, a driving connection between the motor and said cam disc comprising a train of gears and a friction clutch, one member of said train of gears being axially movable, a manually operable shaft, a lift cam mounted on said shaft and adapted to engage and move said axially movable gear member out of gear with a co-operating member of said train of gears, means to return said axially movable gear member into gear, and means for rotatably adjusting said cam disc in relation to the drive of the motor to adjust the said governor control device without otherwise interrupting the drive of the motor.

7. In a gramophone, the combination of a motor, a speed controlling governor therefor, a governor control device, a rotatable cam disc, a spindle carrying said cam disc, a friction clutch on said spindle, a train of gears connecting the friction clutch to the motor, one member of said train of gears being axially movable, a manually operable shaft, a lift cam mounted on said shaft and adapted to engage and move said axially movable gear member out of gear with a co-operating member of said train of gears, means to return said axially movable gear member into gear, and means for rotatably adjusting the cam disc in relation to the drive of the motor to adjust the governor control device without otherwise interrupting the drive of the motor.

8. An attachment for a gramophone having a motor, a turntable driven thereby, a gear train connecting said motor and said turntable, a speed controlling governor for said motor and a control device for said governor, said attachment comprising in combination a movable controlling element, a control driving train for said movable controlling element, said control driving train having one element which is adapted to be disposed in driving relationship with a member of said gear train, a friction clutch which constitutes part of said control driving train and means co-operating with said movable controlling element and adapted to actuate said control device for the governor.

9. An attachment for a gramophone, having a motor, a turntable driven thereby, a gear train connecting said motor and said turntable, a speed controlling governor for said motor and a control device for said governor, said attachment comprising in combination a movable controlling element, a control driving train for said movable controlling element, said control driving train having one element which is adapted to be disposed in driving relationship with a member of said gear train, means to establish and interrupt said driving relationship, a friction clutch which constitutes part of said control driving train and means engaging said movable controlling element and adapted to actuate said control device for the governor.

10. An attachment for a gramophone having a motor, a turntable driven thereby, a gear train connecting said motor and said turntable, a speed controlling governor for said motor and a control device for said governor, said attachment comprising in combination a rotatable cam disc, a spindle carrying said cam disc, a friction clutch on said spindle, a control train of gears, one element of which is connected to said clutch and another element thereof is adapted to mesh with a member of said gear train, a follower for said cam disc and means adapted to connect the follower to the said control device for the governor.

11. An attachment for a gramophone having a motor, a turntable driven thereby, a gear train connecting said motor and said turntable, a speed controlling governor for said motor and a control device for said governor, said attachment comprising in combination a rotatable cam disc, a spindle carrying said cam disc, a friction clutch on said spindle, a control train of gears, one element of which is connected to said clutch and another element thereof is adapted to mesh with a member of said gear train, manually operable means to move into and out of gear a member of said control train of gears, a follower for said cam disc and means adapted to connect the follower to the said control device for the governor.

12. An attachment for a gramophone having a motor, a turntable driven thereby, a gear train connecting said motor and said turntable, a speed controlling governor for said motor and a control device for said governor, said attachment comprising in combination a rotatable cam disc, a spindle carrying said cam disc, a friction clutch on said spindle, a control train of gears, one element of which is connected to said clutch and another element thereof is adapted to mesh with a member of said gear train, an axially movable gear constituting a member of said control train of gears, a manually operable shaft, a lift cam mounted on said shaft and adapted to engage and move said axially movable gear out of engagement with a co-operating member of said control train of gears, means to return said axially movable gear into engagement with the said co-operating member, a follower for said cam disc and means adapted to connect the follower to the said control device for the governor.

In testimony whereof I affix my signature.

NOEL PEMBERTON-BILLING.